INVENTOR.
SAMSON G. SALZINGER 3,331,907
RESIN CURING METHOD
Samson G. Salzinger, 1120 Lassen Drive,
Belmont, Calif. 94002
Continuation of application Ser. No. 284,801, June 3, 1963. This application Aug. 29, 1966, Ser. No. 575,900
2 Claims. (Cl. 264—313)

This application is a continuation of my earlier filed application Ser. No. 284,801 filed June 3, 1963.

This invention relates in general to a method for applying predetermined pressures and particularly high pressures to a plastic or resinous material undergoing cure, which material is supported by a mandrel having a circular cross section.

In the fabrication of plastic bodies, particularly of phenolic resins, which may be reinforced with filaments or tapes of silica, asbestos, graphite, or carbon fabrics or felts, for various uses such as rocket components, heat and pressure must be applied to cylindrical, hollow, frusto-conical bodies or to bodies of other shapes which are circular in cross section.

Various forms of apparatus such as vacuum bags, air or water-containing pressure vessels, or other mechanical pressure-applying means are utilized to assist in the fabrication of heat and ablation resistant structures. Such pressure is required if the density of the resultant structure is to approximate as closely as possible the theoretical maximum.

The application of high pressures to resins undergoing cure becomes particularly difficult when one is dealing with objects such as large cones or large rocket booster exhaust nozzles and the required autoclaves or hydroclaves are costly and progressively less dependable and safe as their sizes increase.

It is an object of this invention to provide a method for applying virtually any predetermined pressure to a layer of resinous or plastic material which is circular in cross section without the requirement of pressure apparatus as described above.

It is a further object of this invention to provide a method of the foregoing character which permits "on-site" fabrication of large difficult-to-transport objects such as large cones or large nozzles for rocket boosters.

A further object of this invention is to provide a method of the foregoing character which involves the application of mechanical pressure under conditions minimizing danger to the operators in the event of failure of any of the equipment utilized.

It is still a further object of this invention to provide a method of the foregoing character which is particularly adapted to the manufacture of conical bodies.

Ancillary objects and advantages of this invention, if not specifically set forth, will become apparent during the course of the description which follows.

Figure 1:
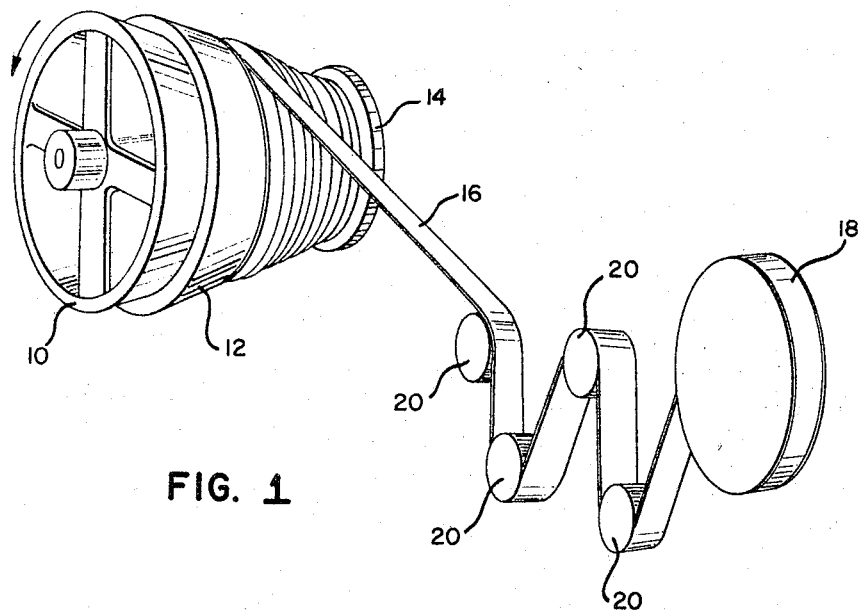
FIGURE 1 is a perspective schematic view showing the method of wrapping a cone in accordance with the teachings of this invention.

Generally, the method of this invention comprises applying a resin, such as one of the phenolic type, which may contain other reinforcing and modifying materials to a non-compressible mandrel of a circular cross section or to any supporting body, the outer surface of which is circular in cross section but which may be of a varying diameter from one end to another, tension-wrapping tape or strands in a plurality of layers about the resin, and continuing with the wrapping until any desired predetermined pressure has been applied. The resin is then heat-cured while under the pressure applied by the plurality of wraps.

The pressure developed normal to a cylindrical surface is directly proportional to the tension applied by each layer of the tape or strand overwrap, and directly proportional to the number of layers or final thickness of the overlap. As the diameter increases, however, the pressure will decrease, all other things remaining constant.

Specifically, where F represents the pounds tension per strand, $n$ indicates the number of strands, $h$ represents the strand thickness, and P represents the pressure (p.s.i.) applied normal to the surface of the resin undergoing cure, $Fn=Pr$ where $r$ represents the radius of the circle represented by the cross section of the resin-covered body. The p.s.i. tensile (T) applied to each strand is $F/h$, where one is speaking in terms of a 1 inch section, and if $r'$ is the radius of the circle represented by a cross section of the body having the overwrap, and if H represents the difference between the radius $r'$ and the radius $r$ (thickness of the overwrap), the following relationship exists:

$$P=\frac{Fn}{r}=\frac{F(r'-r)}{rh}=\frac{FH}{rh}=\frac{HT}{r}$$

The principles described by the relationship $$P=\frac{HT}{r}$$

may be employed to produce high pressures on cylinders and cone shapes or even on spheres if the great circle route is used in filament winding these spheres to provide a reinforced plastic or rubber end product cured under a high pressure. If the tape or strands are of a high tensile material such as nylon tape, and is wrapped at at least 75% of its ultimate tensile strength with sufficient layers to develop high pressures normal to the surface of the wrap, and if the wrapped body is then heated to the required cure temperature, perhaps 300° F., the density of the resultant resin may closely approach that which is theoretically possible.

When wrapping conical objects with a high tensioned overwrap, the individual layers of overwrap should be maintained parallel to the centerline and to achieve this one begins at the small end and wraps progressively toward the larger. If one wraps parallel to the surface, the tape will tend to slide down the cone toward the smaller end, resulting in a relaxation of tension. By applying the overwrap parallel to the centerline of the cone, maximum tension can be applied per strand, which will result in greater pressures developed. An abutting shoulder may be required at the smallest end of the cone to resist the force applied by the tape.

This invention is particularly suitable when applied to the manufacture of large diametered reinforced plastic conical bodies such as reentry cones and rocket booster exhaust nozzles, which may require substantial thicknesses of overwrap material. Since the edge of each wrap is in direct contact with the plastic, a phenolic resin will flow into the tape and part of each layer will be impregnated with resin. During the subsequent cure, the resin present in the overwrap will cure and such tape must be discarded after a single use. If one were to generate the necessary pressures by overwrapping only a single relatively wide strip of tape in the parallel-to-the-cone centerline fashion aforementioned, all of the tape would be required to be discarded after a single use due to resin flow. Hence, relatively narrow tape should be used in direct contact with the resin so that all resin flow occurring will be absorbed by that first layer. Additional tape wrapped thereabout in the required parallel-to-the-centerline fashion to develop the final desired thickness (H) are hence not impregnated with resin and are therefor reuseable. As mentioned earlier, use of narrow tape or filament facilitates wrapping by minimizing the force applied by the wrapping machine to each strand or strip.

Figure 2:
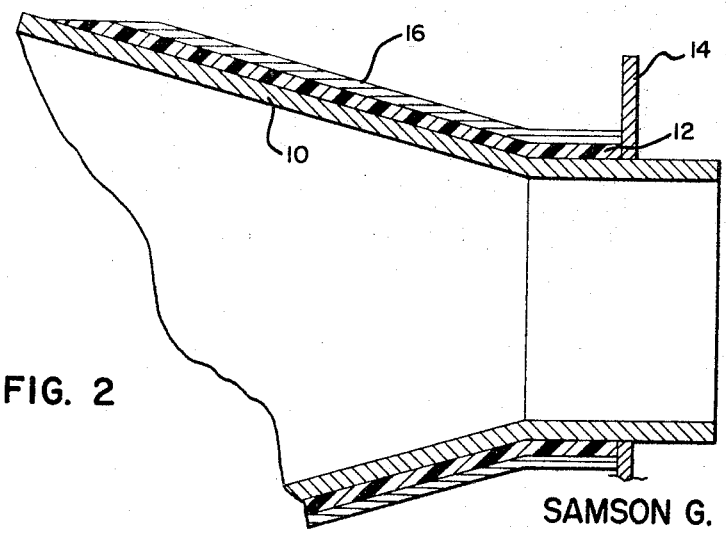
FIGURE 2 is a fragmentary sectional view through the cone of FIGURE 1 showing the method of wrapping a cone in accordance with the teachings of this invention.

FIGURES 1 and 2 show the method of wrapping such a cone where the conical steel mandrel 10 is rotatably mounted and has thereover a layer of resin 12 which is intended to be cured under pressure. The removeable flange 14 is secured about the narrow end of the mandrel and suitable tape 16 having a low modulus of elasticity is supplied from the roll 18 through the rollers 20, one or more of which may be vertically moveable so as to provide means for applying tension to the tape 16. A suitable drag mechanism, not shown, for the supply roll 18 may be employed so that as the mandrel 10 is driven in a counterclockwise direction, as shown in FIGURE 1, the tape will be wrapped under suitable tension. As seen in FIGURE 2, the tape is applied parallel to the center line. Wrapping is continued until the multiplicity of layers develop the pressure desired.

Materials suitable for use as overwrap tapes are glass fibers, cotton, hemp, nylon, Dacron, Fortisan and certain rayons, either in fabric or fiber form, metal strips, and any other suitable flexible material which can be placed under high tension.

Since the plastic materials compact under pressure, the compression ordinarily reduces the tension developed by each layer of overwrap, in accordance with the formula $$t = E \frac{(u)}{r'}$$

where $t$ is the tension loss in p.s.i., $E$ is the modulus of elasticity of the overwrap material in p.s.i., $u$ is the amount of compression or compaction in inches, and $r'$ the radius of the wrapped body to be heated to effect cure. This means that the tension T in the formula $$P = \frac{HT}{r}$$

is reduced by an amount equal to $t$. If high modulus metals or glass were used, the tension loss might be rather large, and therefore it is preferred that the wrapping material have high tensile strength but a low modulus, such as nylon, cotton, hemp, Fortisan, Dacron, and perhaps the rayons. This can be demonstrated by considering a 120″ diameter reinforced plastic part, 3″ thick, which will compact about 10% of its thickness during cure. If glass overwrap was used, glass having a modulus of 12 million p.s.i., the tension loss would be 60,000 p.s.i. This represents almost 50% of the tension that can be developed in the glass during wrapping. However, by using nylon tape having a modulus of 0.42 million p.s.i., the tension loss is only 2,100 p.s.i. or 5% of the tension applied in wrapping.

The synthetic fibers are most preferred, as they shrink to some extent when exposed to heat during the curing operation. Nylon tape, for example, may shrink as much as 4%. This compensates in part for the compressibility factor, but is not a necessity.

Any mandrel or other surface circular in cross section may be used, but it is preferred to use a mandrel having a high coefficient of thermal expansion. Hence, while the fiber overwraps, such as nylon, will tend to shrink when heated to the curing temperature required for the resin, the mandrel, if a material such as aluminum is used, will itself exert a significant internal force against the wrap. When dealing with large diameter parts, this effect may compensate for any compression of the resin or resin-impregnated tape or filaments such as are customarily used in fabricating rocket booster exhaust nozzles and re-entry cones. Wrinkles, which are not desirable in the impregnated tape, are usually introduced when pressure is applied externally and compressibility occurs. The application of internal pressure by means of an expanding mandrel will minimize these wrinkles.

A preferred wrapping material is relatively narrow nylon tape which is formed with a highly uni-directional weave so that, for example, 80% of the yarn lies in the warp direction and 20% in the fill direction. This increases the ultimate tensile strength in the wrap direction compared to tensile strengths available utilizing the standard basket weave of equal warp and fill from about 44,000 p.s.i. to about 75,000 p.s.i. Narrow tape or filaments are preferred to minimize the force that must be applied by the wrapping apparatus to develop the required tape or filament tension.

An advantage of this invention is that extremely large and difficult-to-transport parts may be fabricated "on-site." Only a wrapping lathe, a mandrel, and a source of heat, such as a steam generator, are required.

The following table sets forth the characteristics of preferred fibers from which the wrapping material may be prepared, where "stiffness" is defined as the ratio of the breaking stress to the breaking strain.

*Example 1*

Two 17″ cylinders were made, both on the same mandrel, using 4″ wide silica/phenolic tape (U.S. Polymeric Chemicals Inc. XA–0–34–2). Both were cured for two hours at 300° F. in an oven.

In the case of cylinder A, about 2 layers (total thickness of 0.040″) of nylon shrink tape (2½″ wide) was used, and for cylinder B, about 12 layers was used (total thickness of 0.240″). High tension on the nylon was used in both cases (but not measured). The results were as follows:

TABLE I.—CANDIDATE FIBERS

| | Cotton | Hemp | Fortisan | Nylon 66 (High Ten.) | Nylon 6 (High Ten.) | Dacron (High Ten.) | Glass |
|---|---|---|---|---|---|---|---|
| Specific Gravity | 1.55 | 1.48 | 1.50 | 1.14 | 1.14 | 1.38 | 2.54 |
| Tensile Strength, (70° F.) p.s.i | 44–109,000 | 112–132,000 | 136,000 | 86–128,000 | 109–125,000 | 106–123,000 | 200–220,000 |
| Breaking Elongation, percent | 3–7 | 2–6 | 6 | 18–28 | 16–17.5 | 9–11 | 2.0–3.75 |
| Stiffness, gm./den | 57–60 | 200 | 117 | 32 | 48 | 65 | 322 |
| Effect of Heat (° F.) | (1) | (1) | (1) | (2) | (2) | (3) | 600–2,000 |

1 Good to 275° F.
2 Yellows slightly after 5 hours at 300° F.
3 Melts at 480° F.

| | Cylinder A | Cylinder B |
|---|---|---|
| Thickness (inches) | 0.263, 0.264 | 0.255, 0.249 |
| No. of Plies of XA–0–34–2 | 11 | 12 |
| Thickness/Ply, mils | 23.9 | 21.25 |
| Specific Gravity | 1.62 | 1.74 |
| Resin Content, percent | 30.9 | 27.4 |

Estimated pressure developed (assuming ultimate tensile reached):

Cylinder A:  $P = \dfrac{44,000 \, (.040)}{8.5} = 207$ p.s.i.

Cylinder B:  $P = \dfrac{44,000 \, (.240)}{8.5} = 1,240$ p.s.i.

If one-half ultimate is actually reached:

Cylinder A:  $P_1 = \dfrac{22,000 \, (.040)}{8.5} = 103.5$ p.s.i.

Cylinder B:  $P_1 = \dfrac{22,000 \, (.240)}{8.5} = 620$ p.s.i.

The foregoing indicates that by simply varying the number of plies of overwrap (increasing H), a much higher pressure was developed in the case of cylinder B. This is evident by the lower thickness per ply of the silica tape, the much higher specific gravity, and the lower resin content (result of higher resin flow away from the silica tape). These three effects can only be achieved by the application of high pressures, everything else being the same.

*Example II.—Fabrication of small test cone*

The cone was of 19.6° taper, with a small I.D. of 1⅜" and a large I.D. of 4¼". The reinforced plastic was applied in the form of FM–5020 silica cloth/phenolic tape (U.S. Polymeric Chemicals Inc.) having 33% resin solids (no filler). The silica tape was 1½" wide and was applied parallel to the centerline. The tape tore easily and many wrinkles were introduced. The tape was relatively loose on the mandrel at the conclusion of the application of sufficient plies to provide a thickness of 0.51". Thereafter, one inch wide nylon tape was wrapped parallel to the centerline under high tension approximating 85% of that theoretically possible, giving an effective thickness of 1×cos 70°, or 0.34". No bleeder, vacuum bag, etc. was placed on the silica wrap prior to the overwrap of nylon tape. A threaded nut and shim was used on the small end to hold the entire wrap in place on the mandrel. The entire assembly was placed in an oven for one hour at 180° F. and then for two hours at 325° F., removed and cooled. While still on the mandrel, the nylon was machined therefrom and the ends and O.D. of the cured silica cone machined smooth. There was some small amount of resin flow into the nylon. The cone was sectioned and frustoconical sections were analyzed for specific gravity and resin content. It was found that the specific gravity ranged from 1.708 to 1.781 for corresponding resin contents of 39.6 to 29.3%. The overall weighted average for the cone was a specific gravity of 1.76. The corresponding theoretical specific gravity (theoretically the maximum attainable) ranges approximately from 1.69 to 1.78 for resin contents which range respectively from 40% to 29%. Therefore, in all sections tested, theoretical densities were achieved. It is estimated that pressures in excess of 3,000 p.s.i. were exerted on the silica/phenolic tape by the nylon overwrap, and possibly as high as 18,000 p.s.i. The formula $$P = \frac{HT}{r}$$

neglecting the 6% loss due to the approximate 20° cone angle, would indicate a theoretical pressure of about 18,000 p.s.i.

Experience in conducting the foregoing experiment indicated that it is possible to wrap a 120" to 140" cone three inches thick with one parallel-to-centerline wrap of 1–1½ inch tape, then overwrap with additional layers of parallel-to-centerline wraps of tape to the desired thickness, and all wraps excepting the one next to the reinforced plastic may be utilized again. The inner wrap would be required to be machined off, but the loss of non-recoverable material would be limited, and for a cone of the size suggested, about 2,000 lbs. of nylon tape or, at current prices, about $5,000 worth, would be lost. This is a very small cost in expendible materials per part fabricated. Possible loss of tensile strength of the nylon tape is further minimized by the use of a hollow mandrel to which heat can be applied internally, thereby minimizing the heat transfer to the nylon during whatever cure period is required. This increases the reuseability of the nylon tape since the application of high temperatures to nylon is known to cause some degradation.

When fabricating large cones, the pressure upon the largest diametered portion will be less than the pressure at the smaller diametered portion where the tape width and number of plies remain constant. A preferred method for providing the required constant pressure throughout the entire cone length is to increase the width of the tape in an incremental fashion as one works from the narrowest diametered to the largest diametered portion thereof. This increasing of the tape width need not be done in a smooth and continuous fashion but rather, periodically, a slightly wider tape may be substituted for that previously used and the lead end of the new and relatively wider tape may be simply tacked at the tag-end of the previously used tape of lesser width.

As the application of the innermost wrap under maximum tension has a debulking effect upon the resin or on the resin-impregnated tape or filaments, it is preferred to heat the mandrel to perhaps 160° F. after completing the inner wrap of pressure-applying tape and before the additional wraps are applied. The mandrel may then be permitted to cool and the outer wraps applied.

The process described above has the advantage that no exotic "fast-curing" reinforced plastic materials or special formulations need be used. Rather, conventionally available and utilized resinous materials are suitable. The wrapping tape used may be rubber coated, if desired, to minimize slippage, if any.

As is apparent, the method is particularly suitable for the production of large parts for rocket boosters or exit cones which may be as large as 500" in diameter, though it is suitable wherever one requires pressures in excess of 500 p.s.i. Since no pressure vessels are utilized, there is no explosion danger nor are lesser leaks with resultant loss of pressure at critical points of the curing process possible.

Obviously, many modifications and variations may be made without departing from the spirit and scope of this invention, and therefore only such limitations should be imposed as are indicated in the appended claims.

What is claimed is:

1. A method for curing a reinforced resin material requiring heat and pressure for cure comprising:
   (a) applying a layer of said reinforced resin material to a surface of a non-compressible generally conical support body;
   (b) longitudinally wrapping under tension at least one layer of overwrap material selected from the class consisting of fibrous tape and filament material thereabout until said resin is covered by said material and until a predetermined pressure upon the resin is achieved, such predetermined pressure being substantially that calculated by the formula $$P = \frac{HT}{r}$$

where P is the pressure, H is the thickness of the overwrap, T is the tension applied to each strand and r is the radius of the circle represented by the cross section of the resin covered body, said overwrap material being applied parallel to the centerline of the supporting body and having a width A at the end of the conical body of least diameter and a greater width B at the end of the conical body of greatest diameter thereby maintaining the pressure substantially constant throughout the length of the conical body;

(c) applying heat to the said resin; and (d) thereafter removing said overwrap material.

2. A method for curing a reinforced resin material requiring heat and pressure for cure comprising:

(a) applying a layer of said reinforced resin material to a surface of a non-compressible generally conical support body;

(b) longitudinally wrapping under tension at least one layer of overwrap material selected from the class consisting of fibrous tape and filament material thereabout until said resin is covered by said material and until a predetermined pressure upon the resin is achieved, such predetermined pressure being substantially that calculated by the formula $$P = \frac{HT}{r}$$

where P is the pressure, H is the thickness of the overwrap, T is the tension applied to each strand and r is the radius of the circle represented by the cross section of the resin covered body, said tension applied being greater at the end of the conical body having the larger diameter than the tension applied to the end of the conical body having the lesser diameter thereby maintaining the pressure substantially constant normal to the surface of the resin, said overwrap material being applied parallel to the centerline of the supporting body;

(c) applying heat to said resin; and (d) thereafter removing said overwrap material.

References Cited

UNITED STATES PATENTS

| | | |
|---|---|---|
| 1,405,418 | 2/1922 | Jordan et al. |
| 1,432,531 | 10/1922 | Chandler. |
| 1,670,061 | 5/1928 | Carroll. |
| 2,411,497 | 11/1946 | Barnes _____ 264—316 |
| 2,652,093 | 9/1953 | Burton. |
| 2,744,043 | 5/1956 | Ramberg. |
| 2,749,266 | 6/1956 | Eldred _____ 264—259 |
| 3,050,787 | 8/1962 | Richardson et al. ____ 264—313 |
| 3,050,789 | 8/1962 | Richardson _____ 264—313 |
| 3,081,495 | 3/1963 | Kovatch _____ 264—220 |

ROBERT F. WHITE, *Primary Examiner.*

R. B. MOFFITT, *Assistant Examiner.*